United States Patent [19]

Schober

[11] 3,820,158

[45] June 25, 1974

[54] CARTRIDGE LOADING AND POSITIONING MECHANISM FOR TAPE PLAYING DEVICE

[75] Inventor: Wayne E. Schober, Minneapolis, Minn.

[73] Assignee: Telex Communications, Inc., Minneapolis, Minn.

[22] Filed: May 22, 1972

[21] Appl. No.: 255,261

[52] U.S. Cl. .................................................. 360/96

[51] Int. Cl. ........................................... G11b 23/04

[58] Field of Search ...... 274/4 E, 4 C; 179/100.2 Z; 242/55.19 A, 197–200; 352/72, 78

[56] References Cited

UNITED STATES PATENTS

| | | | |
|---|---|---|---|
| 3,494,572 | 2/1970 | Vemura | 274/4 C |
| 3,612,432 | 10/1971 | Johnson | 274/4 E |

FOREIGN PATENTS OR APPLICATIONS

| | | | |
|---|---|---|---|
| 32,265 | 12/1969 | Japan | 274/4 E |

*Primary Examiner*—Harry N. Haroian

*Attorney, Agent, or Firm*—Carlsen, Carlsen and Sturm

[57] ABSTRACT

A loading and positioning mechanism for tape players and the like which includes a front loading plate having a key-type aperture oriented to introduce a tape containing mechanism, such as a cartridge, at a predetermined angle and having guiding means to receive the tape cartridge at this orientation. The guide means is rotatable to transfer the tape cartridge into playing position so that the cartridge, or carrier, engages the driving mechanisms the player. The magnetic head of the player is carried by such rotatable guide means and is thereby properly positioned against the tape for proper reproduction thereof. The device further includes means for ejecting the tape carrier by a reversal of the operation.

18 Claims, 6 Drawing Figures

CARTRIDGE LOADING AND POSITIONING MECHANISM FOR TAPE PLAYING DEVICE

BACKGROUND OF THE INVENTION

Various tape devices such as eight-track, self contained units and cassette units are well known in the art. Along with the development of the devices for the storage of such information on such compact units, the development of the devices for reproduction of the information contained thereon has also been rapidly advancing.

My invention provides a unique mechanism for positioning and playing of such individual recording units.

Through the use of the principles of my invention, it is possible to essentially blind load the unit and to insure proper positioning of a cartridge while positively insuring that the tape in the cartridge will not be damaged and to also provide a means for controlled ejection of the cartridge while again insuring that the tape will not be damaged.

It is therefore an object of my invention to provide an improved mechanism for loading and positioning a tape carrier and insuring that the tape will be properly positioned before insertion will be permitted.

It is a further object of my invention to provide a player device for tape recorded information and more particularly for information contained on cassettes which provides a means for inserting the cassette into the unit and inserting the same in such a manner that the unit is fully and properly inserted before the driving mechanism for shifting the tape is engaged.

It is still a further object of my invention to provide a cassette positioning concept for a tape readout device which insures that the magnetic head utilized for readout of the tape will not contact the tape or the carrier until the same is totally and properly inserted into readout position.

It is still a further object of my invention to provide a loading and positioning mechanism for a tape cassette player which will include means for ejecting the tape carrier by initially shifting the same from a playing position and therefore ejecting the carrier in such a manner that no injury or damage may be done to the tape.

These and other objects and advantages of my invention will more fully appear from the following description made in connection with the accompanying drawings, where like reference numerals are utilized to designate the same or similar parts throughout the several views and in which.

Figure 1:
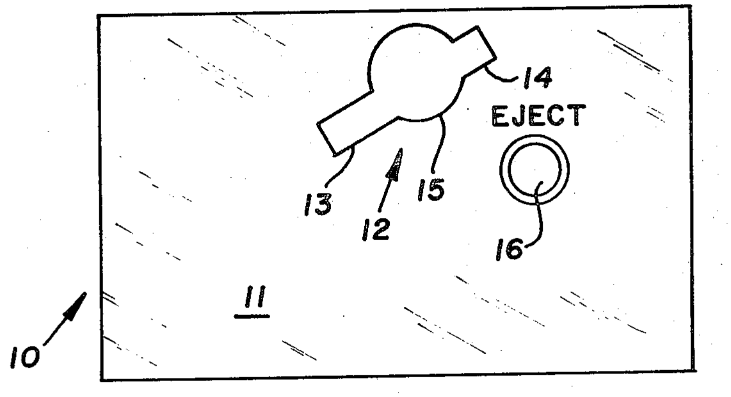
FIG. 1 is a front elevation view of a control plate and carrier insert plate of a device embodying the concepts of my invention.

In accordance with the accompanying drawings, my device is generally designated by reference character 10 and the basic concept thereof is to provide a means for inserting a cassette type tape cartridge into a playing apparatus in such a manner that it will not be inserted in a wrong or backwards position and to thereafter, after such proper insertion, to rotate the tape carrier into playing position.

The mechanisms for playing or reproducing information gathered on such tapes are relatively common to the art and therefore the apparatus of driving, rewinding, magnetic readout of the recorded material and the circuitry for accomplishing the same are not discussed except as is necessary to clarify certain portions of my invention.

It should be noted, as illustrated on FIG. 1, that a front control panel 11 is provided having a key-slot type aperture 12 therethrough, which aperture 12 is offset with respect to the horizontal. It should also be noted that this aperture 12 is provided with three distinct areas thereof. A first section consisting of an in-line aperture arrangement 13, a second section consisting of an in-line aperture 14, and a central circular position 15. The transverse dimension of 13 is slightly less than the transverse dimension of 14 and those acquainted with cassette carriers will realize that the driving side of the cassette is of slightly larger cross section than the tape storage area and therefore these dimensions are selected to prevent backward insertion of the cassette into the device 10. The generally central aperture 15 will permit an operator to rotate the cassette into a horizontal playing position after the same has been placed in my device. An ejection button 16 is also provided through the control panel 11 for removal of the cassette.

The interior of the unit 10 provides a locating surface 20 arranged in generally horizontal position and a portion, generally U-shaped, 21, is removed therefrom to permit a pair of driving heads 22, 23 to extend upwardly into a positive engaging position. Each of these heads 22, 23 is provided with a driving wheel below surface 20 and means (not shown) must be provided for driving these devices in the selected play or rewind direction.

Figure 2:
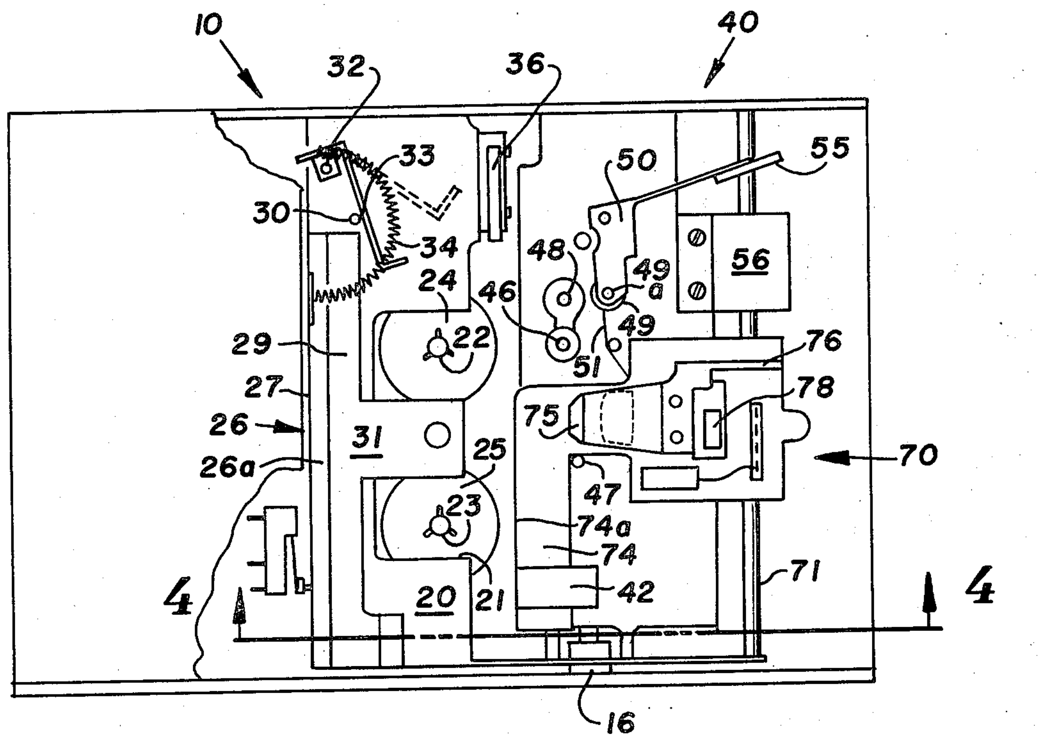
FIG. 2 is a top plan view of the unit of FIG. 1 having a portion of the cover plate removed and other portions thereof broken away for clarity.
Figures 3, 4, 5:
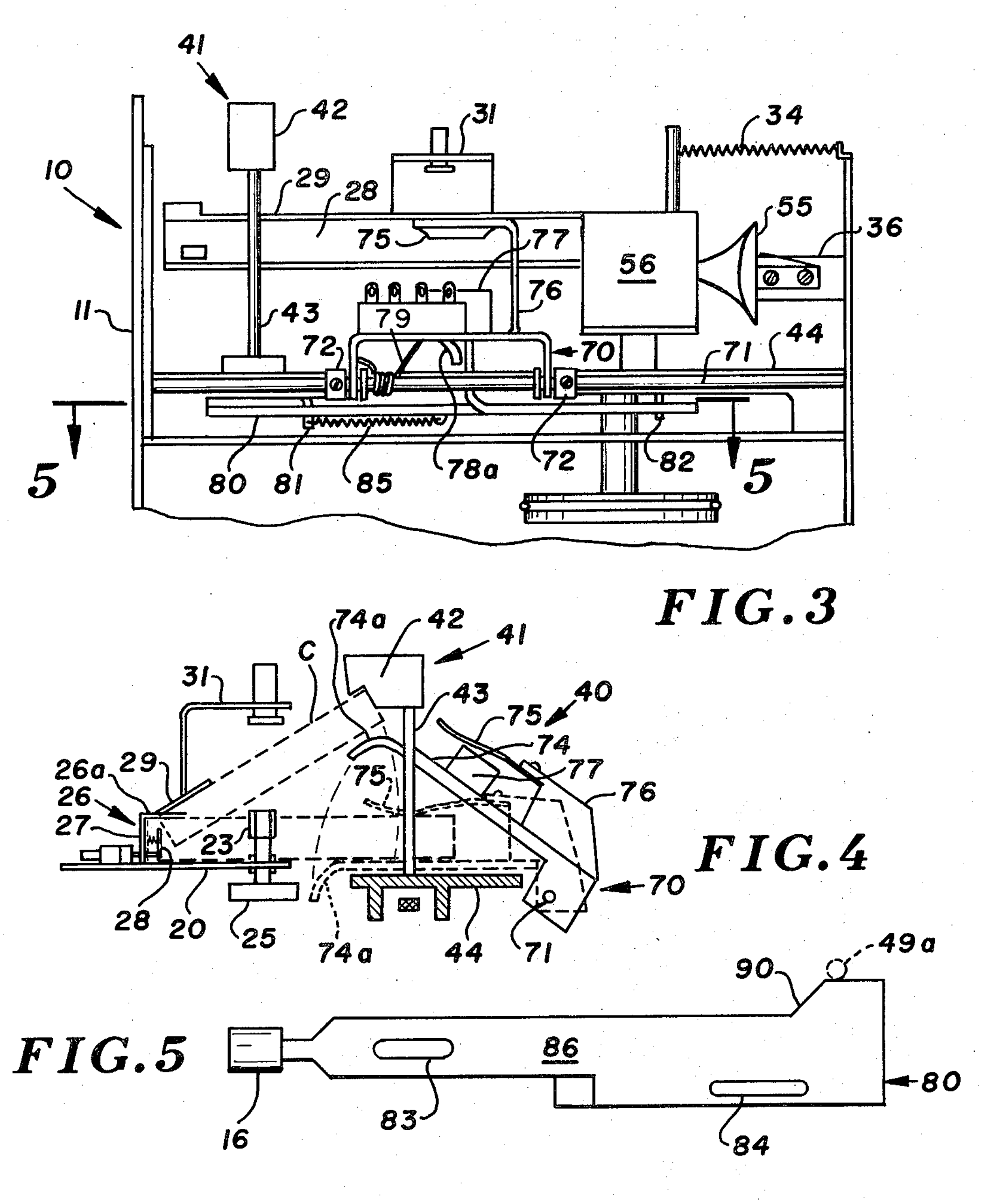
FIG. 3 is a partial side elevation taken from the right side of FIG. 2.
FIG. 4 is a partial vertical section taken substantially along line 4—4 of FIG. 2.
FIG. 5 is a top plan view of a control cam particularly illustrated at line 5—5 of FIG. 3.

Directly above the locating surface 20 and spaced from the driving heads 22, 23 is a stationary receiving housing 26. This housing, as particularly shown in FIG. 4 includes a first upright member 27 and a second biasing member 28 spaced and biased inwardly therefrom with a top housing portion 26*a* guiding movement of the biasing member 28. As shown in FIG. 4, a portion of the housing 26 extends angularly upwardly and inwardly as at 29 which angularity corresponds to the orientation of the aperture 12 of the control panel 11. As illustrated in FIG. 2, this stationary housing 26 extends rearwardly from the front panel a predetermined dimension corresponding to the length of the cassette unit to be received and a stop pin 30 is provided at the rearwardmost extremity thereof.

Arranged for pivotal movement about a pin member 32 secured to the support surface 20 is a first ejection lever member 33 arranged directly in the path of inward travel of the cassette and having spring biasing means 34 associated therewith such that upon further active elements that will be described hereinafter lever member 33 is operable to eject a cassette from the unit.

As stated, a biasing member 28 is provided and it is this member, again extending the entire length of housing 26, that will urge the cassette against the magnetic playing head. A position sensing switch 36 is provided to energize the other portions of the system after the cassette has been inserted and rotated into playing position against the locating surface 20.

Obviously the sizing of the units mentioned this far are in accordance with the cassette which will be inserted therein but it should be obvious to those skilled in the art that certain of these concepts may be applicable to other types of recording tape playback devices.

Directly opposite this aforedescribed section is a cartridge moving and positioning device generally designated 40.

A first stationary guide element 41 having a grooved head portion 42 is mounted upon an upstanding support 43 mounted on base member 44. As illustrated in FIG. 4, the grooved portion of the head 42 is in alignment with not only the angularly arranged stationary housing 29 but also with the uppermost portion of the aperture 12. This head 42 serves as both an introduction guide and an ejection guide for the cassette as well as a stop to align the carrier or cassette with aperture 12. Certain additional locating pins as at 46 and 47 are disposed on base 44 to insure positive positioning of the cassette.

Figure 6:
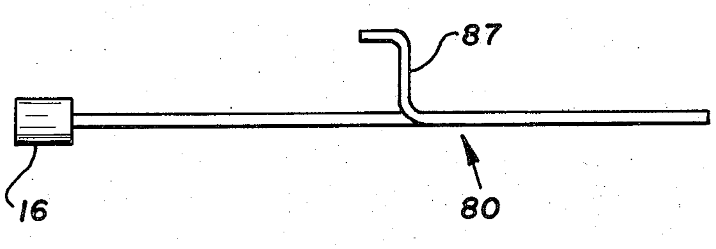
FIG. 6 is a side elevation of the view taken in FIG. 5.

A tensioning device, including a first rotatable capstan 48, arranged to be received into the cassette on one side of the tape passing therethrough, and a second pressure roller 49, pivotally mounted on a pivotally and spring biased lever 50, is provided and for actions and structures that will be explained hereinafter. It is most important to note that a biasing spring 51 is provided against the mounting pin 49*a* of the pressure roller 49 and that at least initial movements of the roller 50 will be controlled through the cam as illustrated in FIGS. 5 and 6 with the spring 51 holding the same against the cam.

Extending outwardly from the lever 50 is a lever 55 comprised of magnetic material to be actuated by an electromagnet 56 mounted on base 44. This tensioning device will insure proper movement of the tape and therefore proper sound reproduction.

A cassette is disposed in an operative position by manually rotating the same from its oriented keyhole insertion aperture to a horizontal position. The mechanism to provide a means for bringing the magnetic readout head into position, holding the tape in downwardly disposed playing position and the mechanism for upward shifting for its ultimate rejection is provided with a pair of cooperative devices termed a shiftable head device 70, and a latching and releasing cam 80.

A first mounting shaft 71 extending rearwardly from the front panel 11 is provided and shiftable head device 70 is pivotally mounted thereon between keeper elements 72. A lower lifting member 74 is provided to extend forwardly from the mounting of the device 70 and is provided with a slightly downwardly depending forward lip 74*a*. This lifting member 74 also extends forwardly towards the aperture 12 and serves as both a lower guide upon insertion of the cassette and a lifting device upon ejection thereof. A downwardly biased member 75 is arranged upon a vertical support 76 to be displaced above this lower member 74 and the magnetic readout head 77 is mounted therebetween.

As illustrated in FIG. 4, the operation of my invention is to permit the insertion of a cassette C at an angular position and upon downward rotation thereof it is brought into contact with the lower lifting member 74 and the same, carrying the entire structure of the shiftable head device is brought downwardly therewith. It should be noted that the biasing member 75 is not brought into contact with the cassette until after at least a partial downward rotation of the cassette has been made and that this biasing member 75 primarily serves to hold the cassette in the position in which it will be played. It should also be noted the magnetic head 77 will not contact the unit until it is in playing position and is particularly urged thereagainst by the opposing biasing member 28 within the stationary housing 26. An aperture 78 is formed on a portion of the lower lifting plate 74 and a downwardly extending guiding leg 78a is provided adjacent thereto.

The entire shiftable head assembly 70 is spring loaded upwardly by a torsion spring 79 or the like affixed to the shaft 71 and therefore a means for holding this assembly in downward position must be supplied and this is supplied in the form shown in FIGS. 5 and 6 and as partially shown in the side view of FIG. 3. It has previously been mentioned that the movement of the pressure roller 49 was controlled by a camming element and this mounting for the roller 49 is illustrated in dotted form on FIG. 5 and is designated 49*a*.

The camming element 80, in the form shown is of a formed plate type and as illustrated, having an ejection button 16 attached thereto. Means must be provided to properly position this cam 80 and pin members 81, 82 may extend downwardly from base 44 and these pin members would be received in the slots 83, 84 respectively of the cam 80. A biasing member 85 may be provided to extend from the first such pin 81 to an aperture or other attachment point 86 on cam 80 such that a constant biasing force is applied to the cam and in order to complete ejection the cam must be forced inwardly. In the form shown, this inward force has been selected due to the forming of the latching device 87 illustrated as an inverted leg portion. The latching portion is aligned with the aperture 78 of the head assembly 70 and it should be obvious to anyone skilled in the art that a latching will occur with this latch and matching aperture whenever the biasing member 85 is free to exert its directed force. At this time latch 87 may engage the guiding leg or camming surface 78*a* to complete the positioning of the cassette and tape head.

As previously mentioned, the pressure mounting pin 49*a* contacts a portion of cam 80 such that when the head 70 is in its downwardly disposed, locked and playing position pressure roller 49 will be urged against the tape being moved therepast to insure proper movement thereof. The camming surface to accomplish this movement is a simple ramp as illustrated at 90 such that whenever the shiftable head 70 is in locked position and is being held thereby due to latch 87 the mounting 49*a* will urge the pressure roller 49 against the tape but upon ejection and movement of the cam 80 to the left, the camming action will release and allow pressure roller 49 to be moved from tape contacting position due to action of the biasing member 51.

The operation of the unit should now be clear to anyone skilled in the art to which my invention pertains. A cassette unit is inserted into aperture 12 in the only way allowable and this provides for immediate proper loading. Upon complete insertion thereof it is rotated into a horizontal playing position where it is held both against the magnetic readout head and against the locating surface. When ejection is required or desired, it is only necessary to press the ejection button which shifts the latching cam and upon upward rotation of the cassette it will be in position to be acted upon by the ejection lever 33 which will then force the same from the aperture 12. It will be guided in its exit by both the lower lifting member 74 and the upper guide 42.

Obviously many other electronic controls could be provided with my device, but the unique portions thereof have been described and these include the unique means for insertion and extraction of the cassette without undue exposure of the contained tape to possible damage and the proper positioning thereof for playing.

I claim:

1. A loading and positioning mechanism for tape playing devices for receiving tape carrier, having tape driving means arranged in a first plane, said mechanism including;

a. plate means defining a tape carrier receiving aperture which aperture is arranged angularly with respect to the first plane;
b. first guide means aligned with said aperture and extending therefrom to guide one side of the carrier;
c. second guide means aligned with said aperture to guide the other side of the carrier;
d. rotatably mounted frame means arranged to receive and retain the other side of the carrier in a first position and swingable to shift the carrier into the first plane to engage the tape driving means in a second position; and,
e. latch means engaging said frame means when in said second position.

2. The structure set forth in claim 1 and said rotatably mounted frame means being biased to return to said first position upon release of said latch means.

3. The structure set forth in claim 2 and means for manually controlling said latch means.

4. The structure set forth in claim 1 and said aperture permitting manual rotation of the carrier to shift said frame means from said first to second position.

5. The structure set forth in claim 1 and the tape playing device being provided with tape tensioning means said mechanism including cam means shifting the tape tensioning means upon shifting of said frame means from first to second position.

6. The structure set forth in claim 1 and said aperture permitting insertion of the carrier in one selected orientation.

7. The structure set forth in claim 1 and stop means spaced angularly from the first plane in alignment with said aperture to align the carrier with said aperture when said frame means has shifted from its second to its first position.

8. The structure set forth in claim 1 and magnetic tape readout means carried by said frame means to be in tape reading position when said frame is shifted to said second position.

9. A loading and positioning mechanism for tape playing devices for receiving tape carrier, having tape driving means arranged in a first plane, said mechanism including;

a. plate means defining a tape carrier receiving aperture which aperture is arranged angularly with respect to said plane;
b. first guide means aligned with said aperture and extending therefrom to guide one side of the carrier;
c. second guide means aligned with said aperture to guide the other side of the carrier;
d. rotatably mounted frame means arranged to receive and retain the other side of the carrier in a first position and swingable to shift the carrier into the first plane to engage the tape driving means in a second position;
e. latch means engaging said frame means when in said second position; and
f. stop means spaced longitudinally from said aperture to control the total insertion of the carrier.

10. The structure set forth in claim 9 and stop means spaced angularly from the first plane in alignment with said aperture to align the carrier with said aperture when said frame means has shifted from its second to its first position.

11. The structure set forth in claim 9 and the tape playing device being provided with tape tensioning means, said mechanism including cam means shifting the tape tensioning means upon shifting of said frame means from first to second position.

12. The structure set forth in claim 9 and biased lever means adjacent said stop means receiving the carrier thereagainst upon insertion thereof and arranged and constructed to provide a pushing, ejection force against the carrier when said frame is shifted to its first position.

13. The structure set forth in claim 12 and the tape playing device being provided with tape tensioning means, said mechanism including cam means shifting the tape tensioning means said mechanism including cam means shifting the tape tensioning means upon shifting of said frame means from first to second position.

14. A loading and positioning mechanism for tape playing devices for receiving tape carrier, having tape driving means arranged in a first plane, said mechanism including;

a. plate means defining a tape carrier receiving aperture which aperture is arranged angularly with respect to said plane, said aperture having dimensions corresponding to the two smallest of the three dimensions of said tape carrier;
b. first guide means aligned with said aperture and extending therefrom to guide one side of the carrier;
c. rotatably mounted frame means arranged to receive and retain the other side of a carrier in a first position and swingable to shift the carrier into the first plane to engage the tape driving means in a second position; and
d. latch means engaging said frame means when in said second position.

15. The structure set forth in claim 14 and the tape playing device being provided with tape tensioning means, said mechanism including cam means shifting the tape tensioning means upon shifting of said frame means from first to second position.

16. The structure set forth in claim 14 and said rotatably mounted frame means being biased to return to said first position upon release of said latch means.

17. The structure set forth in claim 14 and said aperture permitting manual rotation of the carrier to shift said frame means from said first to said second position.

18. The structure set forth in claim 14 and said aperture permitting insertion of the carrier in one selected orientation.

* * * * *